(12) United States Patent
Sardella et al.

(10) Patent No.: US 7,783,818 B1
(45) Date of Patent: Aug. 24, 2010

(54) MODULARIZED INTERCONNECT BETWEEN ROOT COMPLEXES AND I/O MODULES

(75) Inventors: Steven D. Sardella, Hudson, MA (US);
Stephen Strickland, Foxboro, MA (US);
Lawrence J. Feroli, W. Townsend, MA (US)

(73) Assignee: EMC Corporation, Hopkinton, MA (US)

( * ) Notice: Subject to any disclaimer, the term of this patent is extended or adjusted under 35 U.S.C. 154(b) by 103 days.

(21) Appl. No.: 11/965,841

(22) Filed: Dec. 28, 2007

(51) Int. Cl.
*G06F 13/00* (2006.01)

(52) U.S. Cl. .................. 710/313; 710/301; 710/316

(58) Field of Classification Search .......... 710/301, 710/306, 313–316
See application file for complete search history.

(56) References Cited

U.S. PATENT DOCUMENTS

| | | | |
|---|---|---|---|
| 5,901,151 | A | 5/1999 | Bleiweiss et al. |
| 7,062,594 | B1 * | 6/2006 | Sardella et al. ............. 710/314 |
| 7,127,638 | B1 | 10/2006 | Sardella et al. |
| 7,216,188 | B2 | 5/2007 | Reid et al. |
| 2005/0186810 | A1 | 8/2005 | Sardella et al. |
| 2006/0074927 | A1 | 4/2006 | Sullivan et al. |
| 2006/0292901 | A1 | 12/2006 | Sardella et al. |
| 2007/0055807 | A1 | 3/2007 | Asaro et al. |
| 2007/0205822 | A1 * | 9/2007 | Jovanovich et al. ......... 327/526 |
| 2007/0208898 | A1 * | 9/2007 | Pettey et al. ................. 710/312 |
| 2007/0234118 | A1 | 10/2007 | Sardella et al. |
| 2007/0234130 | A1 * | 10/2007 | Sullivan et al. .............. 714/43 |
| 2008/0148295 | A1 * | 6/2008 | Freimuth et al. ............ 719/324 |
| 2009/0089464 | A1 * | 4/2009 | Lach et al. ................... 710/62 |

OTHER PUBLICATIONS

PLX Technology, Inc.; PEX 8524: Flexible & Versatile PCI Express(TM) Switch; Version 1.1; 2005; USA.
Sardella, et al.; U.S. Appl. No. 11/864,115, filed Sep. 28, 2007; 26 pages.

* cited by examiner

*Primary Examiner*—Glenn A Auve
(74) *Attorney, Agent, or Firm*—Guerin & Rodriguez LLP; Michael A. Rodriguez

(57) ABSTRACT

Described are electronics enclosures having an I/O (input/output) module, a CPU (central processing unit) module having a root complex, and a pluggable, field-replaceable interconnect module electrically connected to the root complex of the CPU module by a first set of differential signal pairs and to the I/O module by a second set of differential signal pairs. The field-replaceable interconnect module provides a serialized communication path between the first and second sets of differential signal pairs for carrying serialized differential signaling corresponding to communications exchanged between the root complex of the CPU module and the I/O module.

24 Claims, 12 Drawing Sheets

MODULARIZED INTERCONNECT BETWEEN ROOT COMPLEXES AND I/O MODULES

FIELD OF THE INVENTION

The present invention relates generally to electronics enclosures. More particularly, the present invention relates to modularizing the interconnect between root complexes and I/O (input/output) modules in electronics enclosures.

BACKGROUND

In various electronics industries, particularly the storage industry, serialized interconnects are becoming increasingly popular for use connecting root complexes to input/output (I/O) devices than parallel communications. Industry has found serialized communications to achieve better noise immunity and faster speeds. One popular serial communications interface is PCI Express or PCI-E. In a typical PCI-E system, a root complex interconnects a processor system (with one or more CPUs and memory) to various endpoints (e.g., I/O devices) over point-to-point serial connections, referred to as links. Each link has a width determined by its number of lanes. Each lane contains two pairs of wires: one pair for receiving low-voltage differential signals and the other pair for transmitting low-voltage differential signals.

To produce flexible, manufacturable, and serviceable products, some electronics enclosures (e.g., embedded storage arrays) implement the root complex and I/O devices on separate pluggable modules (i.e., as CPU modules and I/O modules, respectively). A given CPU module typically communicates with a set of I/O modules. Notwithstanding the flexibility provided by modularized CPUs and I/Os, the design of the midplane or backplane typically fixes the specific connectivity between the CPU modules and I/O modules.

Enterprises often offer families of electronics products ranging from low-end (e.g., low performance, low cost, low storage capacity) products to high-end (e.g., high performance, high cost, large storage capacity). To economize, an enterprise may offer a limited number of CPU module designs in support of its family of products, approaching a "one-size-fits-all" design policy. Often, however, such a policy can lead to unsatisfactory and unpopular compromises: in order to accommodate a wide variety of products, the "one-size-fits-all" CPU module usually includes components and functionality unused by some products. The unused components present unnecessary expense.

For example, one electronics product may need peer-to-peer communications between CPU modules, whereas another product has no need for such communications. To support the product with the peer-to-peer requirement, a single CPU module includes a protocol switch with a non-transparent port. Peer CPU modules communicate with each other through their non-transparent ports. For a product without this feature, this switch is an unnecessary additional cost.

As another example, a low-end product may have a requirement for a high degree of connectivity for its I/O modules. Accordingly, the CPU module employs a fan-out switch to increase the number of available lanes provided by the root complex and distribute such lanes to each of the I/O modules. Although this may enable any given I/O module to perform to its bandwidth capability, the overall effect of fan-out on the system can be to reduce performance. A high-end product, designed for high-speed operation, not only may find the fan-out switch unnecessary, but also an impediment to the product's performance. These examples thus illustrate that a single CPU module design, in general, cannot efficiently serve diverse products.

SUMMARY

In one aspect, the invention features an electronics enclosure, comprising an I/O (input/output) module, a CPU (central processing unit) module having a root complex, and a pluggable, field-replaceable interconnect module electrically connected to the root complex of the CPU module by a first set of differential signal pairs and to the I/O module by a second set of differential signal pairs. The field-replaceable interconnect module provides a serialized communication path between the first and second sets of differential signal pairs for carrying serialized differential signaling corresponding to communications exchanged between the root complex of the CPU module and the I/O module.

In another aspect, the invention features an electronics enclosure comprising a plurality of I/O (input/output) modules, first and second CPU (central processing unit) modules, each CPU module having a root complex, and a first pluggable, field-replaceable interconnect module electrically connected to the root complex of the first CPU module by a first set of differential signal pairs and to a first one of the I/O modules by a second set of differential signal pairs. The first field-replaceable interconnect module provides a serialized communication path between the first and second sets of differential signal pairs for carrying serialized differential signaling corresponding to communications exchanged between the root complex of the first CPU module and the first one of the I/O modules. The electronics enclosure also has a second pluggable, field-replaceable interconnect module electrically connected to the root complex of the second CPU module by a third set of differential signal pairs and to a second one of the I/O modules by a fourth set of differential signal pairs. The second field-replaceable interconnect module provides a serialized communication path between the third and fourth sets of differential signal pairs for carrying serialized differential signaling corresponding to communications exchanged between the root complex of the second CPU module and the second one of the I/O modules.

In still another aspect, the invention features a pluggable, field-replaceable interconnect module comprising a circuit board, a first electrical connector electrically coupled to the circuit board for removably plugging the circuit board to a CPU (central processing unit) module. The first electrical connector has electrical pins providing a first set of differential signal pairs by which to carry serialized differential signaling between the circuit board and the CPU module. The interconnect module also includes a second electrical connector electrically coupled to the circuit board for removably plugging the circuit board to an I/O (input/output) module. The second electrical connector has electrical pins providing a second set of differential signal pairs by which to carry serialized differential signaling between the circuit board and the I/O module. In addition, the interconnect module has a serialized communication path between the first and second sets of differential signal pairs of the electrical connectors for carrying serialized differential signaling corresponding to communications exchanged between the CPU module and the I/O module.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

An interconnect module, as described herein, "modularizes" the interconnect between the CPU modules and I/O modules of an electronics enclosure. Modularizing the interconnect introduces flexibility into the design of the interconnectivity between CPU and I/O modules: the midplane or backplane of the electronics enclosure no longer determinately fixes the interconnectivity. Instead, the design of the interconnect module determines the interconnectivity—and such design can be tailored to suit a particular product. Advantageously, the "one-size-fits-all" CPU module can thus become more of a reality; the differences among products in a product family can be achieved by different interconnect module designs.

In addition, interconnect modules, like CPU modules and I/O modules, are hot-pluggable, field-replaceable or customer-replaceable units (FRUs or CRUs). In general, a FRU is a circuit board, a subassembly, or subsystem that a user or technician can quickly and easily remove and replace within an electronics enclosure, often at the customer site. In some embodiments of electronics enclosures, a removable interconnect module replaces a standard midplane (or backplane), costing no more additional interconnect pins beyond the standard midplane. In other embodiments, a removable interconnect module cooperates with a midplane (or backplane). Further, board designers can include active components in their interconnect module designs because interconnect modules are hot pluggable, field replaceable; a practice often shied away from for fixed (i.e., non-pluggable, difficult to replace) midplanes.

Figure 1:
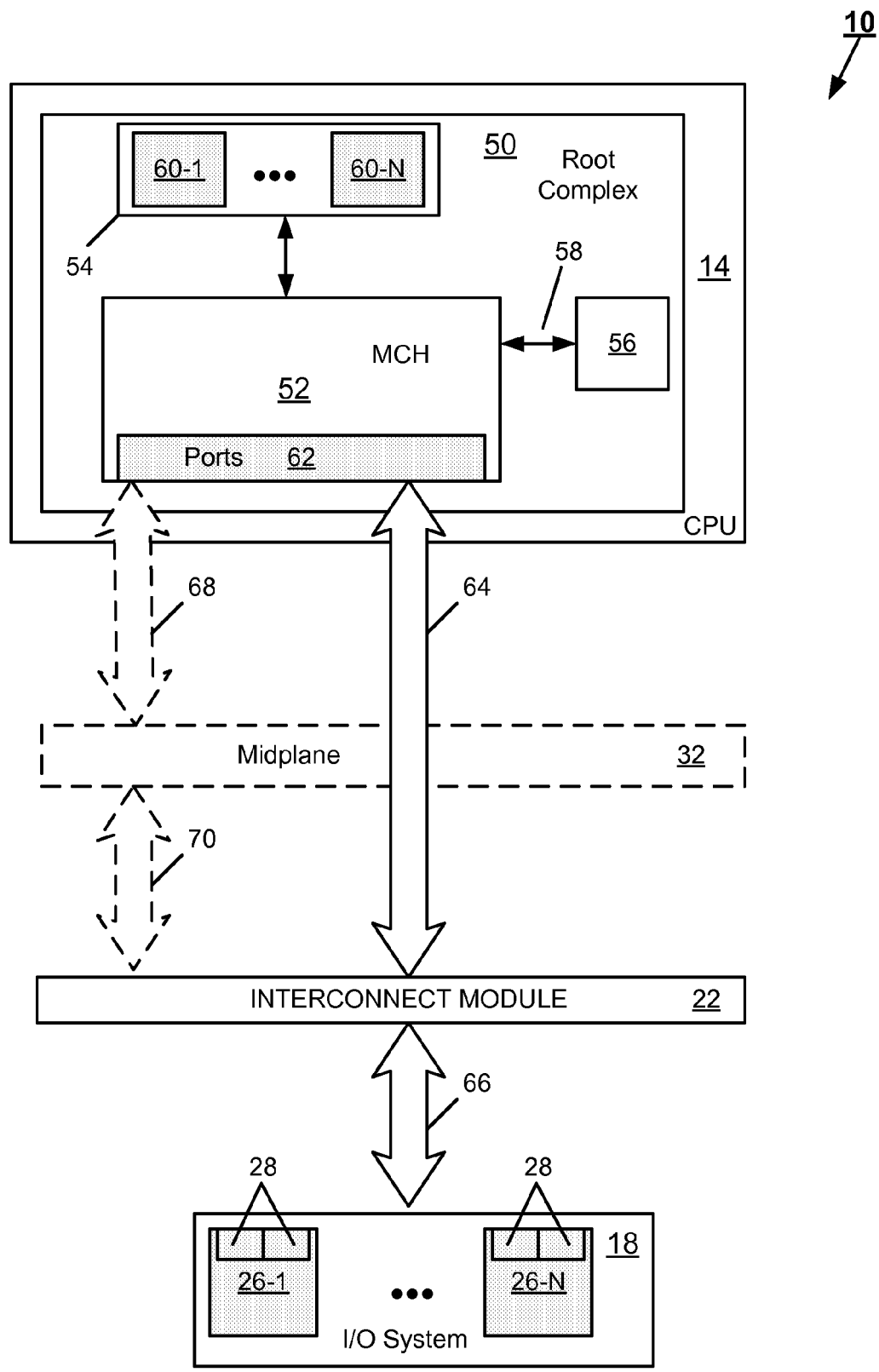
FIG. 1 is a block diagram of an embodiment of an electronics enclosure including a CPU module interconnected to a plurality of I/O modules by a modularized interconnect module.

FIG. 1 shows an embodiment of an electronics enclosure 10, for example, a data storage array or blade server, constructed in accordance with the invention. The electronics enclosure 10 includes a hot-pluggable, field-replaceable CPU (central processing unit) module 14 interconnected to an I/O (input/output) system 18 through a modularized interconnect module 22. CPU modules, generally, may also be referred to as storage processors, data movers, server blade, or just blades.

The CPU module 14 includes a root complex 50 having an MCH (memory controller hub) device 52, also called a Northbridge, which is in communication with a processor system 54 and with memory 56 over a memory bus 58. The processor system 54 includes one or more central processing units 60-1, 60-N. The MCH device 52, processor system 54, and memory 56 can be implemented as a single chip or chipset.

The MCH device 52 has one or more ports 62 and a fixed number of serialized differential signal pairs (also called lanes) 64 by which to communicate with the I/O system 18 through these the ports 62. The MCH device 52 can use one of a variety of chip-to-chip interconnect technologies to transmit data serially over the differential signal pairs 64. Examples of such serialized interconnect technologies include, but are not limited to, PCI Express™, HyperTransport™, and Common System Interconnect (CSI). Serialized low-voltage differential signaling, with its high noise immunity in comparison to parallel signaling, enables communications through electrical connectors and over external connections, such as those on a midplane and on an interconnect module. In one embodiment, the MCH device 52 is implemented with the Intel® 5000P Chipset Memory Controller Hub, manufactured by Intel Corporation of Santa Clara, Calif.

The I/O system 18 includes one or more field-replaceable I/O modules 26-1, 26-N (generally 26). Examples of types of I/O modules 26 include, but are not limited to, Fibre Channel, iSCSI (Internet SCSI), FICON (Fibre Connectivity), SAS (serial attached SCSI), INFINIBAND switch fabric technology, and Ethernet (10/100/1000 Base-T). Each I/O module 26 has a plurality of I/O ports 28. Here, as a representative example, the I/O modules 26 have two I/O ports each. Serial communications between the root complex 50 and each I/O module 26 occurs through the interconnect module 22.

In general, the field-replaceable interconnect module 22 provides a serialized chip-to-chip interconnect for conveying differential data between the root complex 50 and the I/O modules 26. The interconnect module 22 routes communications arriving from the CPU module 14 over the differential signal pairs 64 to the I/O modules 26, and routes communications arriving from the I/O modules 26 over differential signal pairs 66 to the CPU module 14. As described in more detail below, embodiments of the interconnect module 22 include, but are not limited to, a base design as a hardwired board and complex, flexible routing boards based on customer or product needs.

In another embodiment, the electronics enclosure 10 includes a midplane 32 (shown in dashed lines) interconnected between the CPU module 14 and the interconnect module 22. Generally, the midplane 32 is mechanically fixed within the electronics enclosure 10 (i.e., not a FRU), which can make it labor-intensive to remove (and may require sending the entire electronics enclosure to the equipment manufacturer for service, rather than service in the field). Communications to and from the CPU module 14 pass through the midplane 32 over differential signal pairs 68, 70.

Figure 2:
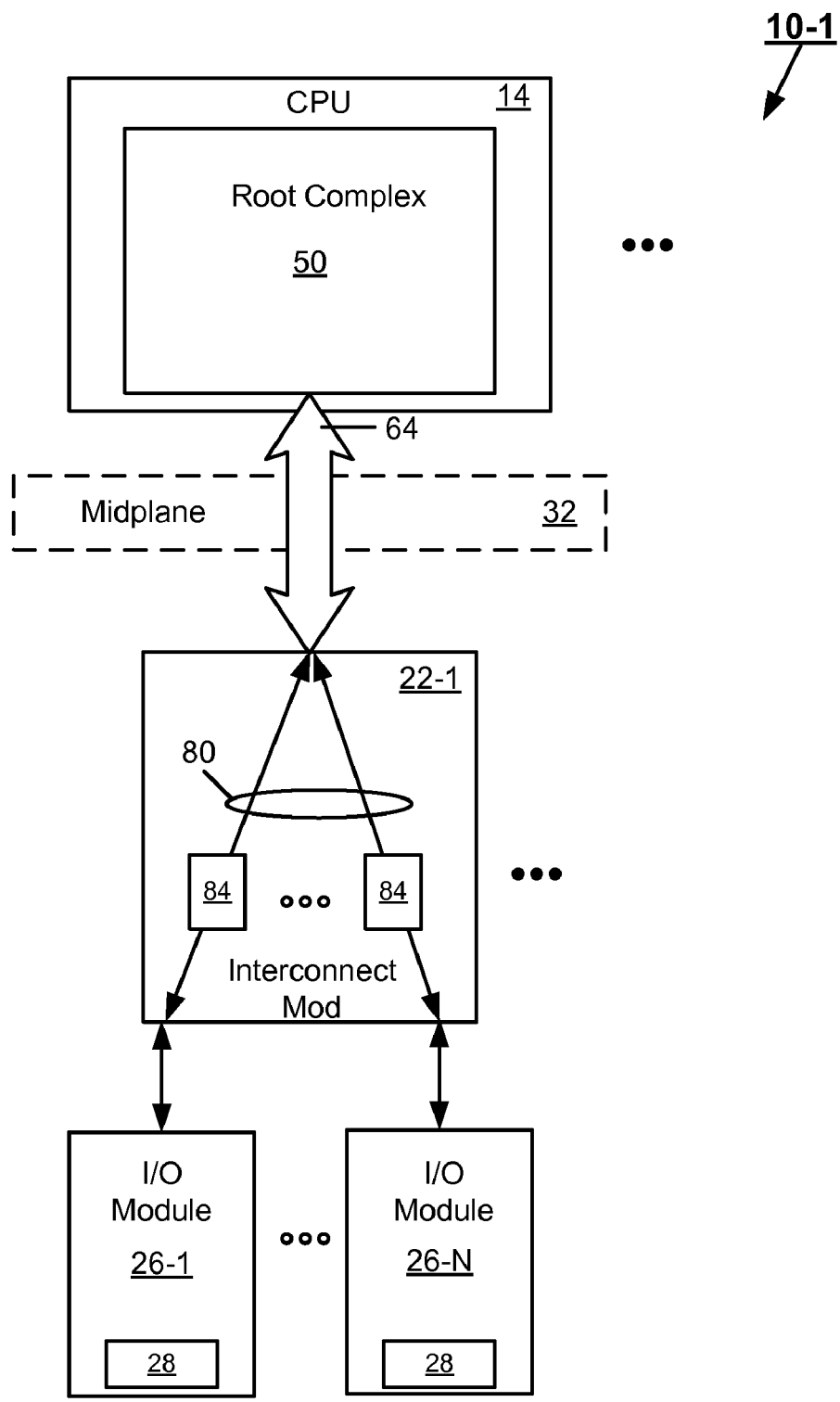
FIG. 2 is a block diagram of the electronics enclosure having a first embodiment of the interconnect module.

FIG. 2 shows an exemplary electronics enclosure 10-1 with an embodiment of interconnect module 22-1. In this embodiment, the interconnect module 22-1 includes hardwired electrical paths 80 for routing lanes 64 from the CPU module 14 to the I/O modules 26. To accelerate transmission speed, the interconnect module 22-1 can have repeaters, buffers, and analog switches 84 in the communication paths 80 to and from the I/O modules 26. The ellipses indicate that the electronics enclosure 100-1 can have additional CPU modules 14, interconnect modules 22-1, and I/O modules 26 than those shown. This particular embodiment of interconnect module 22-1 can be advantageously used in electronics enclosures designed for low latency communications between the root complex 50 and the I/O modules 26. In an alternative embodiment, shown in dashed lines, a midplane 32 is interconnected between the interconnect module 22-1 and CPU module 14.

Figure 3:
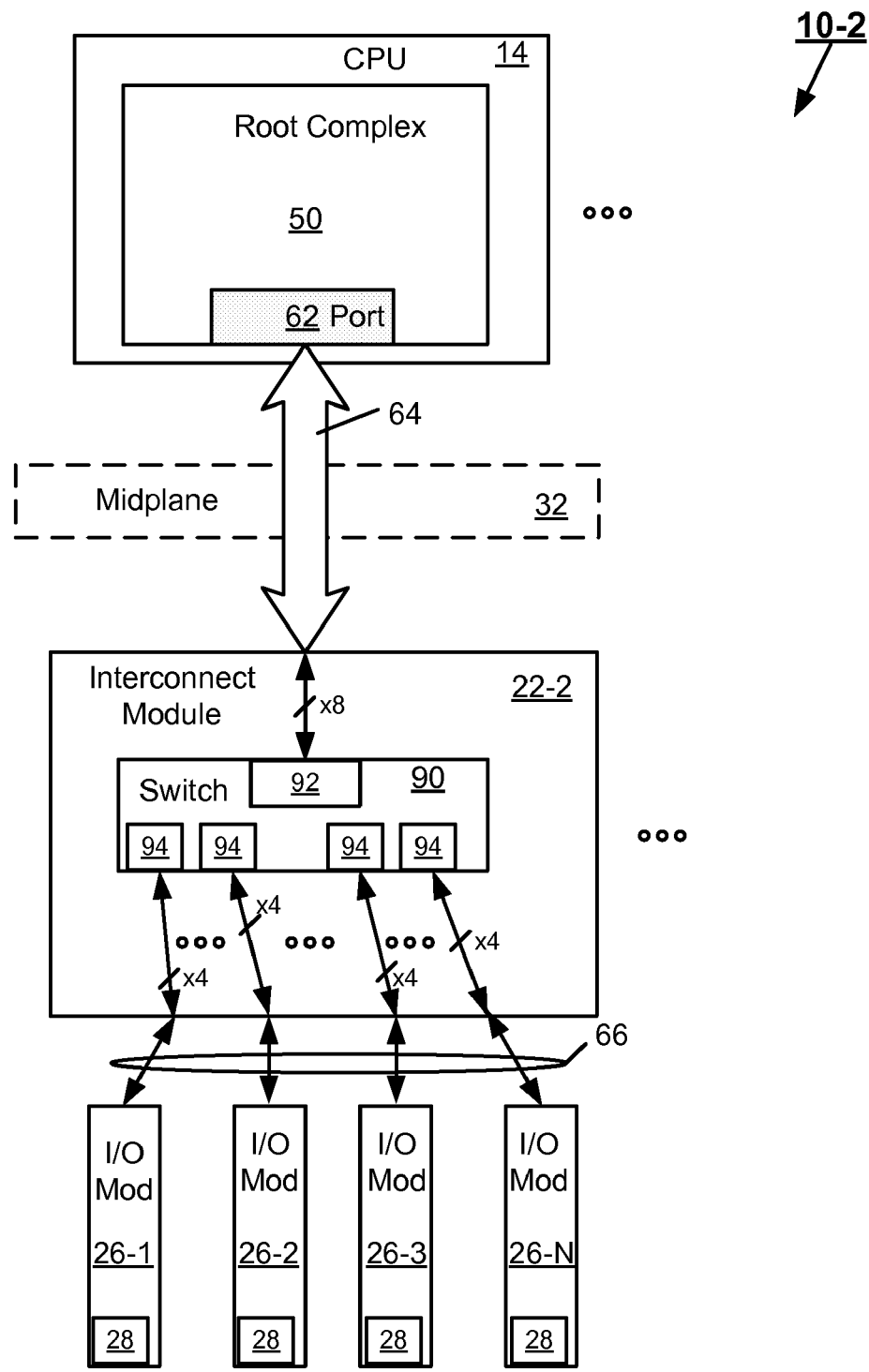
FIG. 3 is a block diagram of the electronics enclosure having a second embodiment of the interconnect module.

FIG. 3 shows an exemplary electronics enclosure 10-2 having another embodiment of interconnect module 22-2. This embodiment of interconnect module 22-2 includes a switch 90 that fans out the lanes 64 to each of the I/O modules 26. The switch 90 has an upstream port 92 in electrical communication with the lanes 64 from the root complex 50 and a plurality of downstream ports 94 in electrical communication with the I/O modules 26.

For example, the upstream port 92 can be electrically coupled to 8 lanes (×8) from a port 62 of the root complex 50, and each downstream port 94 can provide 4 lanes (×4) to one of the I/O modules 26. From 8 lanes, the switch 90 makes 16 lanes available to the I/O modules 26. Again, the ellipses indicate that the electronics enclosure 10-2 can have additional CPU modules 14, interconnect modules 22-2, and I/O modules 26 than those shown. Advantageously, this embodiment of interconnect module 22-2 increases connectivity among the I/O modules 26. As an example, the fan-out switch 90 can be implemented using a PEX 8524 PCI Express™ switch, manufactured by PLX Technology of Sunnyvale, Calif.

Figure 4:
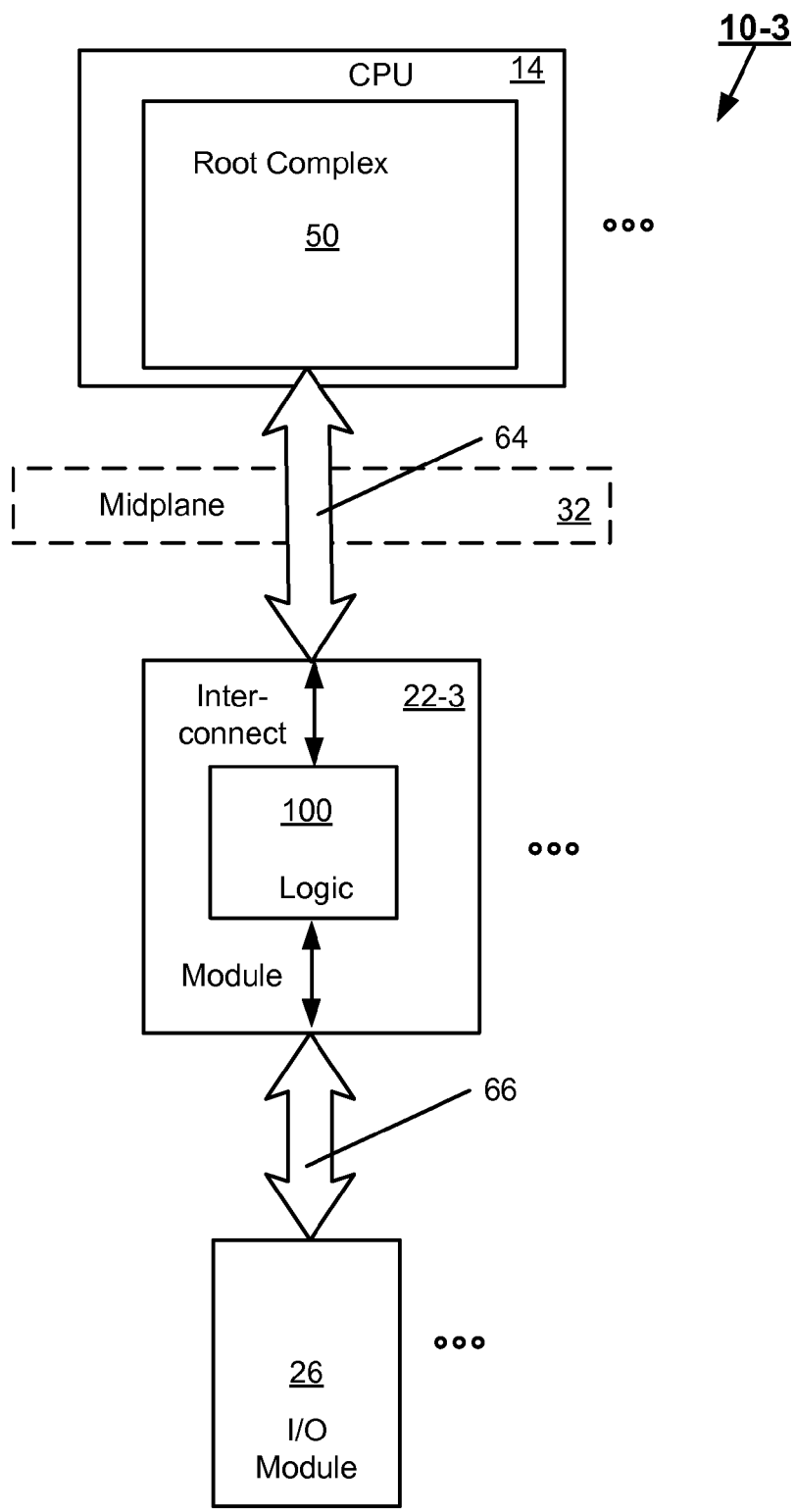
FIG. 4 is a block diagram of the electronics enclosure having a third embodiment of the interconnect module.

FIG. 4 shows another exemplary electronics enclosure 10-3 having another embodiment of interconnect module 22-3. The interconnect module 22-3 has a logic 100 (e.g., a bridge) for converting communications from a first serialized interconnect technology into a second serialized interconnect technology. As used herein, logic can be implemented as hardware (circuitry, integrated circuits, chipsets, and/or active and passive components), software, firmware, or combinations thereof. The particular implementation of logic 100 depends upon which two serialized interconnect technologies the logic 100 is converting between.

For example, the root complex 50 can be transmitting data to the interconnect module 22-3 over the differential signal pairs 64 in accordance with HyperTransport™. The logic 100 receives these communications and converts them into differential signals in accordance with PCI Express™ for transmission to the I/O modules 26 over the differential signal pairs 66. Conversely, the logic 100 converts PCI Express™ signals received from the I/O modules 26 into HyperTransport™ signals sent to the root complex 50.

As another example, the root complex 50 can be transmitting data to the interconnect module 22-3 over the differential signal pairs 64 in accordance with PCI Express™, and the logic 100 converts the differential signals into Fibre Channel signals that are transmitted to the I/O modules 26—over differential signal pairs 66. In the reverse direction, the logic 100 converts Fibre Channel signals into PCI Express™ signals.

Figure 5:
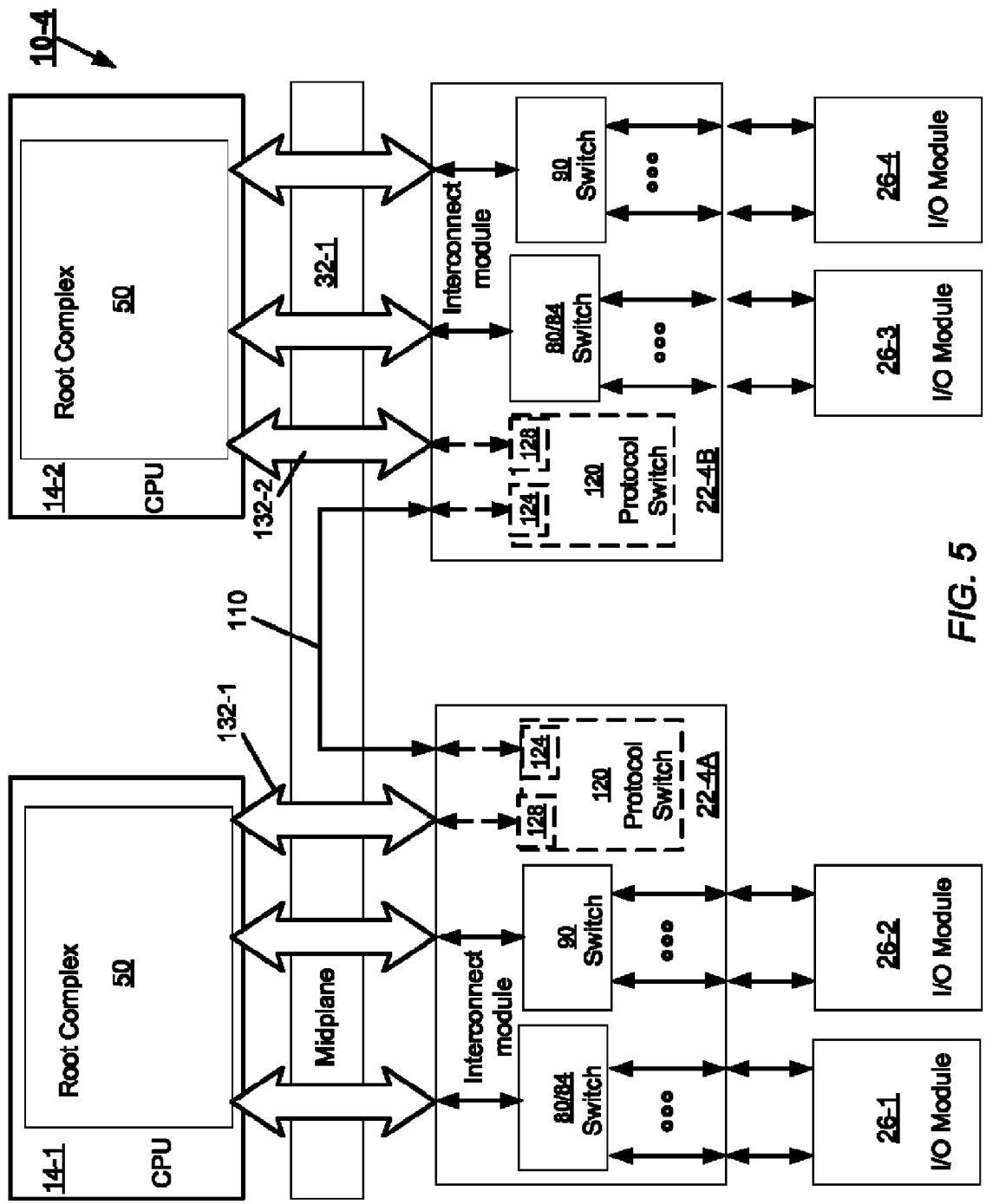
FIG. 5 is a block diagram of embodiments of electronics enclosures having multiple CPU modules, each CPU module in communication with a plurality of I/O modules and with each other through a midplane and an interconnect module.

FIG. 5 shows an embodiment of an electronics enclosure 10-4 having multiple CPU modules 14-1, 14-2 (generally, 14). Each CPU module 14 is in communication with an interconnect module 22-4A, 22-4B (generally, 22-4) through a midplane 32-1. In this embodiment, the midplane 32-1 has an electrical path 110 for communication between the interconnect modules 22-4. Communication between the interconnect modules 22-4 enables communication between the CPU modules 14-1, 14-2 (for example, to provide a communication manager interface (CMI) by which each CPU module is able to mirror data cached in the other CPU module, as described in U.S. patent application Ser. No. 11/393,230, filed Mar. 30, 2006, the entirety of which U.S. patent application is incorporated by reference herein).

To enable peer-to-peer communication between the CPU modules 14-1, 14-2, each interconnect module 22-4A, 22-4B has a serial protocol switch 120-1, 120-2 (generally, 120), respectively, with a non-transparent port 124. The non-transparent ports 124 are electrically coupled to this electrical path 110 of the midplane 32-1. The non-transparent bridging performed by the switch 120 provides the needed isolation between CPU modules for peer-to-peer communication. The aforementioned PEX 8524 PCI Express™ switch can be used to implement the switch 120.

Another port 128 of the switch 120 is in communication with a root complex 50 through the midplane 32-1 over differential signal pairs 132. Accordingly, peer-to-peer communications originating at the CPU module 14-1 traverse the midplane 32-1 over lanes 132-1, enter port 128 and exit the non-transparent port 124 of the switch 120-1, travel the midplane 32-1 over the communication path 110, enter the non-transparent port 124 and exit port 128 of the switch 120-2, and pass to the other CPU module 14-2 over lanes 132-2.

In addition, each interconnect module 22-4 is in electrical communication with low-latency (i.e., high performance) I/O modules 26-1, 26-3 and with high-connectivity (i.e., lower performance) I/O modules 26-2, 26-4. For serial communications with the low-latency modules 26-1, 26-3, the interconnect modules 22-4 can have hardwired routing 80 with repeaters, buffers, and analog switching logic 84, as described in connection with FIG. 2. For serial communications with the high-connectivity I/O modules 26-2, 26-4, the interconnect modules 22-4 can use serial protocol fan-out switches 90, as described in connection with FIG. 3.

In another embodiment of the electronics enclosure 10-4, the electrical path 110 is unused (i.e., the CPU modules 14 do not communicate with each other). In this embodiment of the electronics enclosure 10-4, the dashed lines signify that the switches 120-1, 120-2 are absent, although the midplane communication paths 110, 132 may be present.

Accordingly, products that do not need peer-to-peer communication between CPU modules can use interconnect modules 22-4 that lack this switch 120—thus avoiding having to pay for a component not being used. Conversely, only those manufacturers of products that need the extra feature need pay for that feature.

Figure 6:
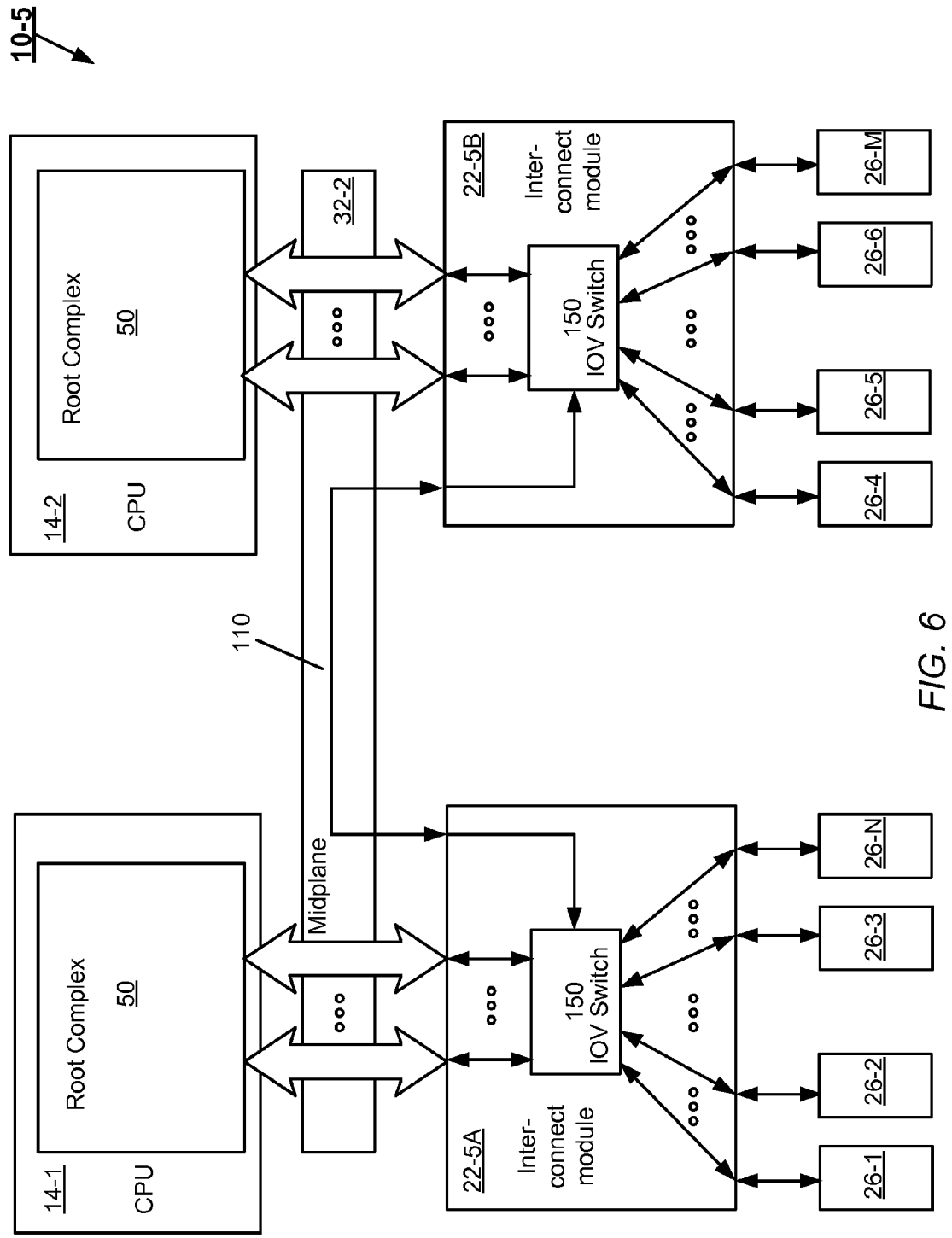
FIG. 6 is a block diagram of another embodiment of an electronics enclosure having multiple CPU modules, each CPU module in communication with a plurality of I/O modules and with each other through a midplane and an interconnect module.

FIG. 6 shows another exemplary electronics enclosure 10-5 having multiple CPU modules 14-1, 14-2 electrically interconnected to a "pool" of I/O modules 26-1, 26-2, 26-3, 26-N, 26-4, 26-5, 26-6, and 26-7 (generally, 26) through interconnect modules 22-5A, 22-5B (generally, 22-5) and a midplane 32-2. The midplane 32-2 includes an electrical path 110 for communication between the interconnect modules 22-4.

In general, PCI-E topologies use dedicated endpoints mapped to specific root complexes. For example, in FIG. 5, I/O modules 26-1, 26-2 are mapped to the root complex of CPU module 14-1, the I/O modules 26-3, 26-4 are mapped to CPU module 14-2. A physical endpoint, such as I/O module 26-1, is associated with one root complex 50, and is not shareable by the other root complex. I/O virtualization (IOV) enables the sharing of peripherals and endpoints by different root complexes. One level of I/O virtualization, called multi-root I/O virtualization, uses a multi-root switch in cooperation with multi-root endpoint that enables multiple root complexes to share common endpoints.

In this electronics enclosure 10-5 of FIG. 6, each interconnect module 22-5 includes a multi-root IOV switch 150. The IOV switch 150 of the interconnect module 22-5A is in communication with each I/O module 26-1, 26-2, 26-3, 26-N, whereas the IOV switch of the interconnect module 22-5B is in communication with each I/O module 26-4, 26-5, 26-6, 26-M. The IOV switches 150 are also in communication with each other over the midplane communication path 110.

Through the IOV switches 150, each CPU module 14 is able to communication with any of the I/O modules 26 in the "pool". For example, CPU module 14 can communicate with I/O modules 26-1, 26-2, 26-3, and 26-N through the IOV switch 150 of interconnect module 22-5A and with I/O modules 26-4, 26-5, 26-6, and 26-M through both IOV switches 150—over the midplane communication path 110. Accordingly, the interconnect modules 22-5 facilitate the implementation of a failover mechanism. For example, in the event the CPU module 14-2 fails, the CPU module 14-1 can dynamically switch to accessing the I/O modules 26-4, 26-5, 26-6, and 26-M through the IOV switches 150 and the midplane communication path 110, while continuing to access I/O modules 26-1, 26-2, 26-3, and 26-N. After failover is accomplished, the failing CPU module 14-2 can be replaced without sacrificing data availability.

In addition, the modularizing of the interconnect facilitates upgrades to electronics enclosures. Consider an electronics enclosure with an interconnect module having a fan-out switch, such as interconnect module 22-3 described in connection with FIG. 3. When a product group or application is ready to take advantage of IOV functionality, a technician or user can replace the interconnect module currently installed in that electronics enclosure with an interconnect module having an IOV switch, such as the interconnect module 22-5. With the swap of the interconnect module, the CPU modules 14 of the resulting, upgraded electronics enclosure are able to communicate with any one of the I/O modules (presumably, the CPU modules 14 possessed such inchoate capability before the upgrade).

Interconnect modules can be designed to support technologies other than chip-to-chip interconnect technologies, such as PCI-E and HyperTransport™. By placing and interconnecting the appropriate protocol switches and devices on an interconnect module, a switch fabric for another protocol, such as Fibre Channel, INFINIBAND switch fabric technology, or Ethernet, can be implemented within a single electronics enclosure, thus eliminating or reducing any need for a switch fabric external to the electronics enclosure.

Figure 7:
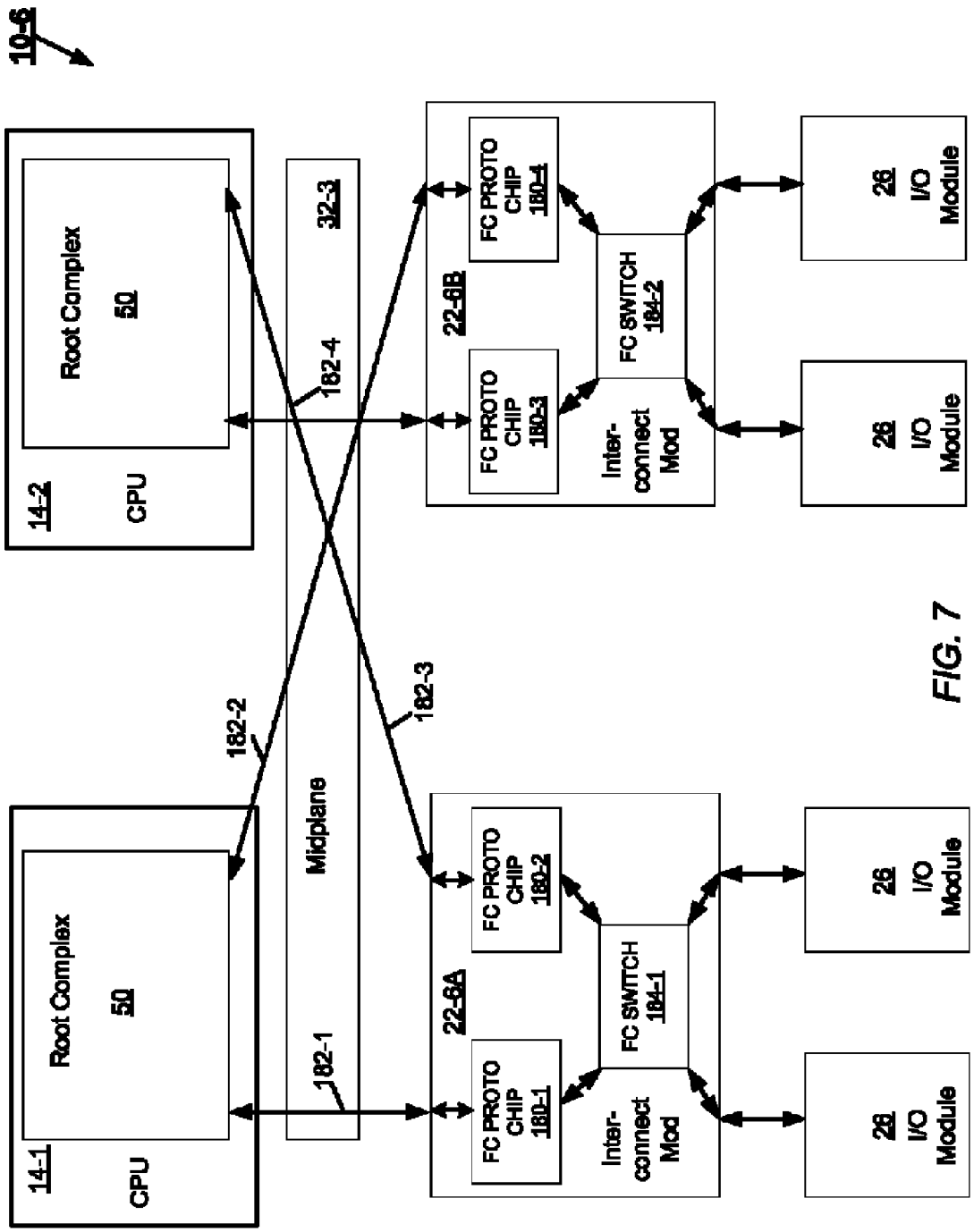
FIG. 7 is a block diagram of another embodiment of an electronics enclosure with interconnect modules that provide a Fibre Channel switch.

FIG. 7 shows an example of an electronics enclosure 10-6 in which the interconnect modules 22-6 provide redundant Fibre Channel switch fabrics through which CPU modules 14-1, 14-2 can communicate with the I/O modules 26. The CPU modules 14 communicate with the interconnect modules 22-6A, 226B through a midplane 32-3 over sets of differential signal pairs 182-1, 182-2, 182-3, and 182-4.

Interconnect module 22-6A includes first and second protocol components 180-1, 180-2 in communication with a Fibre Channel (FC) switch 184-1. Similarly, interconnect module 22-6B includes first and second protocol components 180-3, 180-4 in communication with a Fibre Channel (FC) switch 184-2. The Fibre Channel switches 184-1, 184-2 are in communication with the I/O modules 26, which can implemented as Fibre Channel repeaters (retimers).

Each CPU module 14-1, 14-2 is connected to both FC switch fabrics. More specifically, the root complex 50 of a first CPU module 14-1 is in communication with the first protocol chip 180-1 of the interconnect module 22-6A over a first set of differential signaling pairs 182-1, and in communication with the second protocol chip 180-4 of the second interconnect module 22-6B over a second set of differential signaling pairs 182-2. Similarly, the root complex 50 of the second CPU module 14-2 is in communication with the second protocol chip 180-2 of the first interconnect module 22-6A over a third set of differential signaling pairs 182-3, and in communication with the first protocol chip 180-4 of the second interconnect module 22-6B over a fourth set of differential signaling pairs 182-4.

The protocol components 180 receive differential signals from the root complexes 50 in accordance with a first serial interconnect technology, for example PCI-E, and convert the signals into Fibre Channel signals, which pass to the FC switches 184-1, 184-2. In the reverse direction, the protocol components 180 convert Fibre Channel signals received from the FC switches 184-1, 184-2 into differential signals of a serial interconnect technology (again, e.g., PCI-E) for transmission to the root complexes 50.

Figure 8:
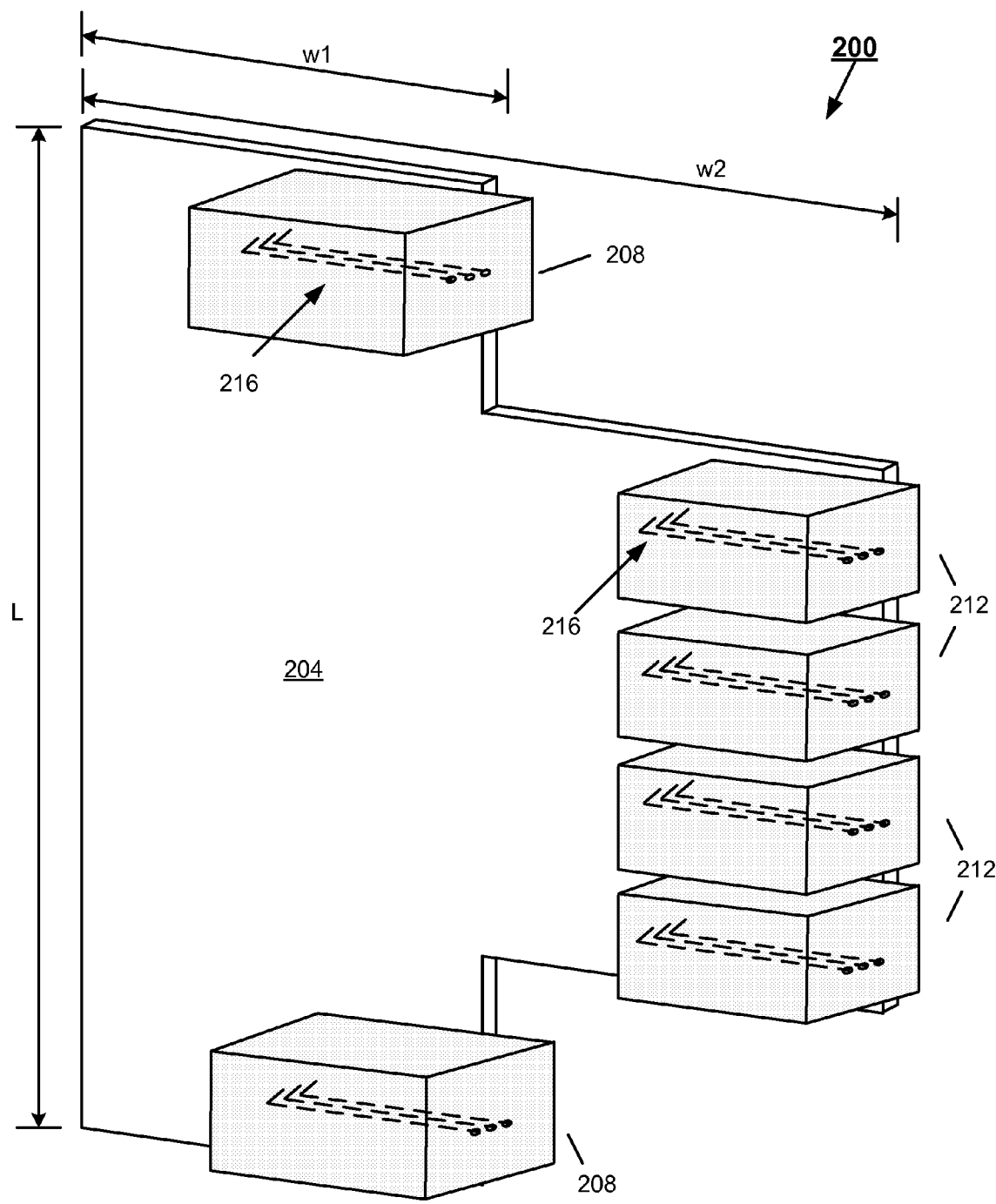
FIG. 8 is a diagram of an embodiment of a vertical interconnect module.

FIG. 8 shows a side view of an embodiment of an interconnect module 200 including a planar circuit board 204 with orthogonal electrical connectors 208, 212 connected thereto, each electrical connector 208, 212 projecting slightly beyond an edge of the circuit board 204. Illustrated for example as female connectors, each electrical connector 208, 212 has a plurality of electrical pins 216 extending therethrough and bending orthogonally to make electrical contact with electrical traces on the circuit board 204. Only a few pins are shown to illustrate the pins 216 generally. The mating side of each electrical connector 208, 212 faces the same direction (i.e., the direction from which the CPU modules 14 and I/O modules 26 join the interconnect module 200). Electrical connectors 208 are adapted to connect to electrical connectors on the CPU modules 14; electrical connectors 212 to electrical connectors on the I/O modules 26. The circuit board 204 can have logic (i.e., hardware, software, firmware, or combinations thereof) for implementing the logic of any of the various embodiments of interconnect modules described herein.

The circuit board 204 has a length (L), a first width (w1) at upper and lower edges (as represented in the FIG.) of the circuit board 204, and a second, longer width (w2) at a middle region of the circuit board 204. The different widths, (w1) and (w2), correspond to the different depths of the CPU modules 14 and I/O modules 26; the CPU modules 14 having a greater depth than the I/O modules 26. For embodiments in which the CPU modules 14 and I/O modules 26 have approximately the same depth, the circuit board 204 can have the same width (i.e., a non-staggered edge) along its full length (L).

Figure 9:
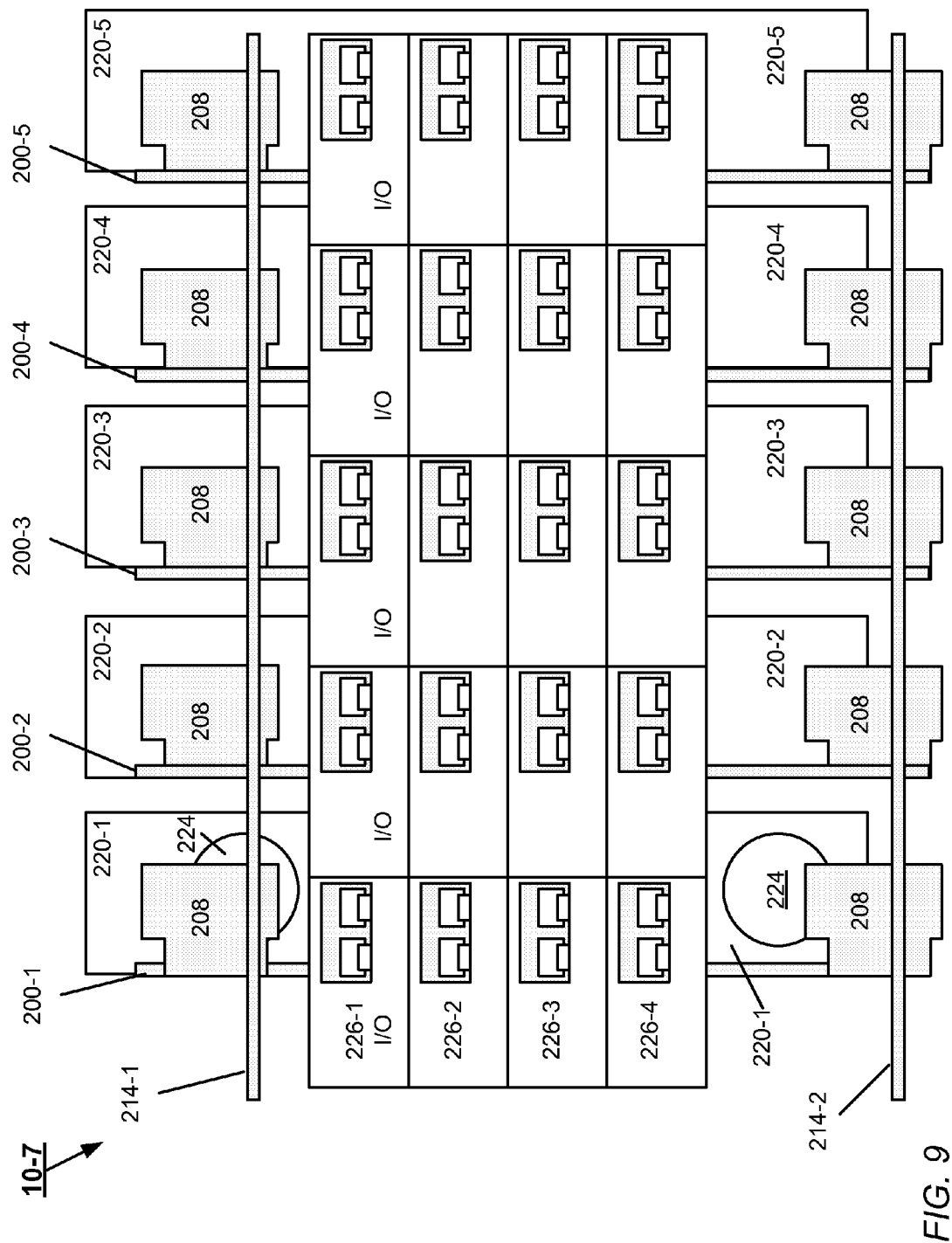
FIG. 9 is a diagram of an embodiment of a vertical interconnect module coupled to a fan pack tower.
Figure 10:
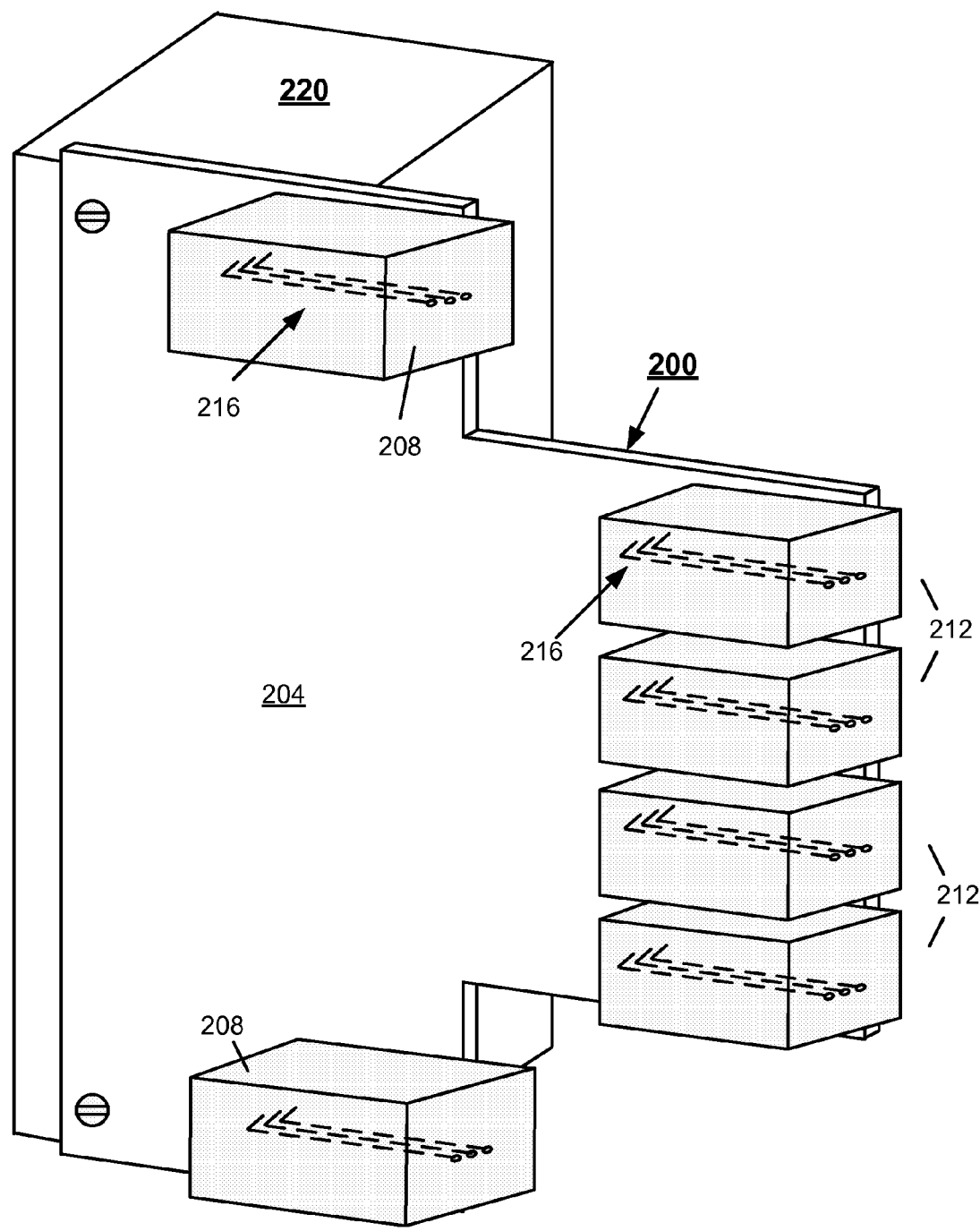
FIG. 10 is a rear view of an electronics enclosure having vertical interconnect modules interconnecting multiple CPU modules with a plurality of I/O modules.

FIG. 9 shows an end view of an embodiment of an electronics enclosure 10-7 having five vertically installed interconnect modules of FIG. 8, here referenced individually as 200-1, 200-2, 200-3, 200-4, and 200-5 and generally as 200. The electronics enclosure 10-7 also includes five vertical towers 220-1, 220-2, 220-3, 220-4, and 220-5 (generally, 220) of fans 224, with each interconnect module 200 being fixed to one side of one of the towers 220 (e.g., as shown in FIG. 10). Attaching the interconnect module 200 to a tower 220 enables both to be unplugged and removed from the electronics enclosure 10-7 as a unit. Vertical, as used herein, corresponds to the orientation of the electronics enclosure 10-7 as shown in FIG. 9, which also corresponds to the expected orientation of the electronics enclosure 10-7 when deployed.

Advantageously, the orientation of the interconnect modules 200 within the electronics enclosure 10-7 is favorable for front-to-back (or back-to-front) airflow generated by the fan pack towers 220. The "edge-on" profile presented by the interconnect modules 200 to the towers 220 produces less obstruction to airflow than if the interconnect modules are oriented in a traditional midplane arrangement (i.e., as a plane orthogonal to the direction of the airflow).

Each interconnect module 200 is interconnected crosswise with two CPU modules 214-1, 214-2 (i.e., the board edges of the CPU modules abut (or are near) the circuit board edge of the interconnect module and the plane of each CPU module board is orthogonal to the plane of the interconnect module circuit board 204). The components mounted on the CPU modules 214-1, 214-2, including the electrical connectors that connect to the electrical connectors 208 of the interconnect module 200, are not shown to simplify the illustration. Peer-to-peer communications between the CPU modules 214-1, 214-2 can be carried over any one, more, or all of the interconnect modules 200. For example, for a high-end product, peer-to-peer traffic may be heavy, and peer-to-peer paths running through all of the interconnect modules 200 may be needed to support the traffic.

Each interconnect module 200 is also connected to four I/O modules 226-1, 226-2, 226-3, and 226-4 (generally, 226). The I/O modules 226 obscure the electrical connectors 212 (FIG. 8) of the interconnect modules 200.

Although the electronics enclosure 10-7 has five interconnect modules 200, other embodiments of the electronics enclosure 10-7 can have as few as two interconnect modules—to support data availability in the event one of the interconnect modules fails—and more than the five (keeping the number of CPU and I/O modules unchanged). Advantageously, the greater the number of interconnect modules in the electronics enclosure, the fewer the number of pins that each interconnect module needs for plugging into CPU modules and I/O modules; having less pins simplifies the mechanical insertion of an interconnect module, which may need to simultaneously connect to multiple CPU and I/O modules when plugged into the enclosure.

Figure 11:
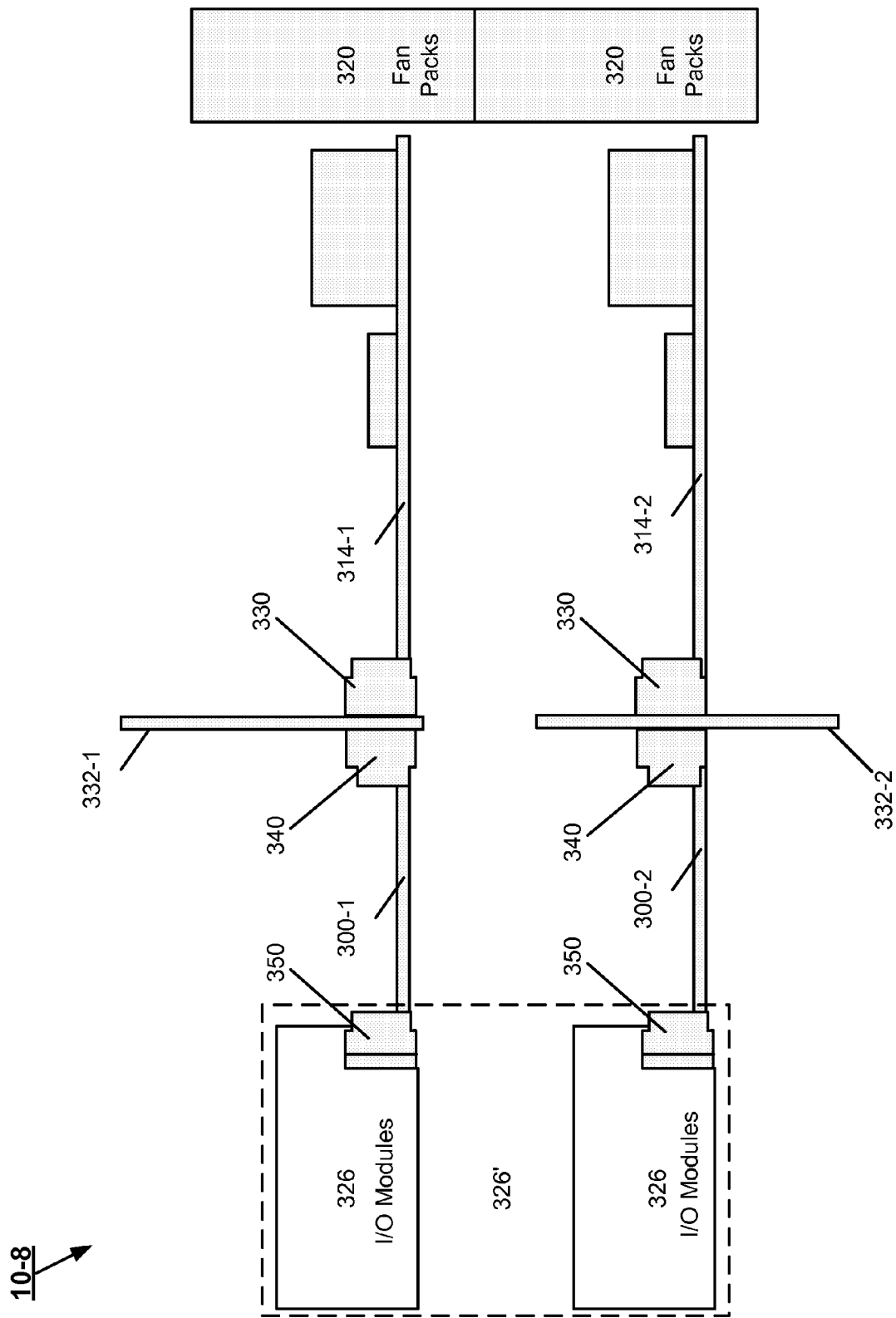
FIG. 11 is a side view of an embodiment of an electronics enclosure having horizontal interconnect modules interconnecting multiple CPU modules with a plurality of I/O modules.
Figure 12:
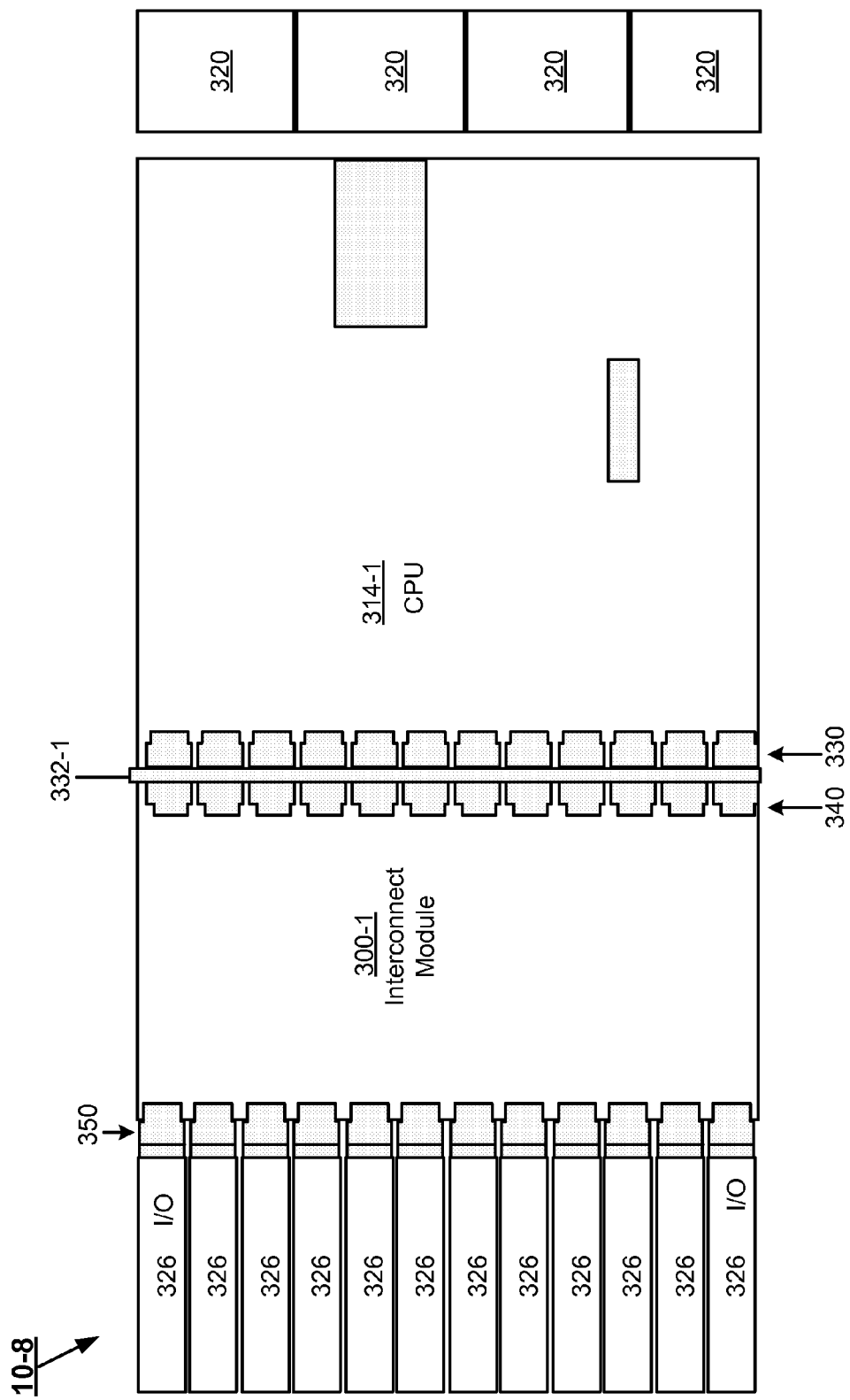
FIG. 12 is a top view of the electronics enclosure of FIG. 11.

FIG. 11 shows a side view and FIG. 12 shows a top view of another embodiment of an electronics enclosure 10-8 having two horizontally installed CPU modules 314-1, 314-2, two midplanes 332-1, 332-2, two horizontally installed interconnect modules 300-1, 300-2, a plurality of I/O modules 326, and fan packs 320. Horizontal, as used herein, corresponds to the orientation of the electronics enclosure 10-8 as shown in FIG. 11, which also corresponds to the expected orientation of the electronics enclosure 10-8 when deployed.

Each CPU module 314 has a row of electrical connectors 330. Along one edge, each interconnect connector 300 has a first row of electrical connectors 340 that connect to the row of electrical connectors 330 of a CPU module 314 through a midplane 332. At the opposite edge, each interconnect connector 300 has a second row of electrical connectors 340 that connect to the electrical connectors 350 of the I/O modules 326.

In this embodiment, the CPU modules 314-1, 314-2 do not engage in peer-to-peer communications. To enable peer-to-peer communication, a doublewide I/O module 326' replaces two "stacked" I/O modules 326: a first I/O module 326 being connected to the interconnect module 300-1; and an I/O module 326 second being connected to the interconnect module 300-2. Peer-to-peer communications from one CPU module to the other CPU module pass through this doublewide I/O module 326'.

Aspects of the present invention may be embodied in hardware, firmware, or software (i.e., program code). Program code may be embodied as computer-executable instructions on or in one or more articles of manufacture, or in or on computer-readable medium. In general, any standard or proprietary, programming or interpretive language can be used to produce the computer-executable instructions. Examples of such languages include C, C++, Pascal, JAVA, BASIC, Visual Basic, and C#. A computer, computing system, or computer system, as used herein, is any programmable machine or device that inputs, processes, and outputs instructions, commands, or data.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims.

To illustrate, any combination of the described embodiments can be implemented on a single interconnect module. Further, embodiments of interconnect modules can include logic for implementing other types of functionality not directly related to the exchange of serial data between root complexes and I/O modules. For example, storage arrays often include redundant management module FRUs by which personnel can communicate with the storage array in order to administer or configure it. In addition to providing a serial interconnect between a root complex and I/O modules, an interconnect module can be thus designed to include also the functionality of a management module.

What is claimed is:

1. An electronics enclosure, comprising:
an I/O (input/output) module;
a CPU (central processing unit) module having a root complex;
an interconnect module electrically connected to the root complex of the CPU module by a first set of differential signal pairs and to the I/O module by a second set of differential signal pairs, the interconnect module being a pluggable, field-replaceable unit that is separate from the I/O module, the interconnect module providing a serialized communication path between the first and second sets of differential signal pairs for carrying serialized differential signaling corresponding to communications exchanged between the root complex of the CPU module and the I/O module; and
a midplane electrically connected between the CPU module and the interconnect module.

2. The electronics enclosure of claim 1, wherein the interconnect module includes a switch that fans out the differential signal pairs in the first set of differential signal pairs for distribution to I/O modules.

3. The electronics enclosure of claim 1, wherein the interconnect module includes logic for converting the serialized differential signaling from a first low-voltage differential signaling protocol format into a second low-voltage differential signaling protocol format.

4. The electronics enclosure of claim 1, wherein the interconnect module includes an I/O virtualization switch in the serialized communication path between the first and second sets of differential signal pairs.

5. The electronics enclosure of claim 1, wherein the interconnect module includes a protocol switch having a non-transparent port by which the CPU module can engage in peer-to-peer communications with another CPU module in the electronics enclosure.

6. The electronics enclosure of claim 1, wherein the interconnect module further comprises a switching fabric in the serialized communication path between the first and second sets of differential signal pairs.

7. The electronics enclosure of claim 6, wherein the switching fabric is one of a Fibre Channel, Ethernet, and INFINIBAND switching fabric.

8. The electronics enclosure of claim 1, wherein the pluggable, field-replaceable interconnect module comprises:
a circuit board;
a first electrical connector electrically coupled to the circuit board, the first electrical connector having electrical pins for implementing the first set of differential signal pairs by which to carry serialized differential signaling between the circuit board and the CPU module; and
a second electrical connector electrically coupled to the circuit board for removably plugging the circuit board to the I/O (input/output) module, the second electrical connector having electrical pins for implementing the differential signal pairs by which to carry serialized differential signaling between the circuit board and the I/O module when the second electrical connector is removably coupled to the I/O module.

9. The electronics enclosure of claim 8, wherein the circuit board has a first width where the CPU module connects to the circuit board and a second, different width where the I/O module connects to the circuit board.

10. An electronics enclosure, comprising:
a plurality of I/O (input/output) modules;
first and second CPU (central processing unit) modules, each CPU module having a root complex;
a first interconnect module electrically connected to the root complex of the first CPU module by a first set of differential signal pairs and to a first one of the I/O modules by a second set of differential signal pairs, the first field-replaceable interconnect module providing a serialized communication path between the first and second sets of differential signal pairs for carrying serialized differential signaling corresponding to communications exchanged between the root complex of the first CPU module and the first one of the I/O modules;
a second interconnect module electrically connected to the root complex of the second CPU module by a third set of differential signal pairs and to a second one of the I/O modules by a fourth set of differential signal pairs, the second field-replaceable interconnect module providing a serialized communication path between the third and fourth sets of differential signal pairs for carrying serialized differential signaling corresponding to communications exchanged between the root complex of the second CPU module and the second one of the I/O modules; and
a midplane electrically connected between the CPU modules and the interconnect modules, the midplane providing an electrical communication path between the interconnect modules,
wherein each interconnect module is a pluggable, field-replaceable unit that is separate from the I/O module to which that interconnect module is connected.

11. The electronics enclosure of claim 10, wherein each interconnect module includes a switch with a non-transparent port electrically coupled to the electrical communication path provided by the midplane, and wherein the CPU modules can engage in peer-to-peer communications through the non-transparent ports over the electrical communication path provided by the midplane.

12. The electronics enclosure of claim 10, wherein each interconnect module further comprises a switching fabric and each CPU module is electrically connected to the switching fabric of the first and of the second interconnect modules through the midplane.

13. The electronics enclosure of claim 12, wherein each switching fabric is a Fibre Channel, Ethernet, or INFINIBAND switching fabric.

14. The electronics enclosure of claim 10, wherein each interconnect module includes an I/O virtualization switch electrically coupled to the electrical communication path provided by the midplane, to each CPU module and to each I/O module, and wherein each of the CPU modules are able to communicate with any of the I/O modules through one or more of the I/O virtualization switches.

15. An interconnect module, comprising:
a circuit board;
a first electrical connector electrically coupled to the circuit board for removably plugging the circuit board to a CPU (central processing unit) module, the first electrical connector having electrical pins providing a first set of differential signal pairs by which to carry serialized differential signaling between the circuit board and the CPU module; and
a second electrical connector electrically coupled to the circuit board for removably plugging the circuit board to an I/O (input/output) module, the second electrical connector having electrical pins providing a second set of differential signal pairs by which to carry serialized differential signaling between the circuit board and the I/O module;
a serialized communication path between the first and second sets of differential signal pairs of the electrical connectors for carrying serialized differential signaling corresponding to communications exchanged between the CPU module and the I/O module; and
logic for converting the serialized differential signaling from a first low-voltage differential signaling protocol format into a second low-voltage differential signaling protocol format,
wherein the interconnect module is a pluggable, field replaceable unit that is separate from the I/O module to which the second electrical connector is removably plugged.

16. The pluggable, field-replaceable interconnect module of claim 15, further comprising a switch that fans out the differential signal pairs in the first set of differential signal pairs for distribution to I/O modules.

17. The pluggable, field-replaceable interconnect module of claim 15, further comprising an I/O virtualization switch in the serialized communication path between the first and second sets of differential signal pairs.

18. The pluggable, field-replaceable interconnect module of claim 15, further comprising a protocol switch having a non-transparent port by which the CPU module can engage in peer-to-peer communications with another CPU module in the electronics enclosure.

19. The pluggable, field-replaceable interconnect module of claim 15, further comprising a switching fabric in the serialized communication path between the first and second sets of differential signal pairs.

20. The pluggable, field-replaceable interconnect module of claim 19, wherein the switching fabric is one of a Fibre Channel, Ethernet, and INFINIBAND switching fabric.

21. An electronics enclosure, comprising:
an I/O (input/output) module;
a CPU (central processing unit) module having a root complex; and
an interconnect module electrically connected to the root complex of the CPU module by a first set of differential signal pairs and to the I/O module by a second set of differential signal pairs, the interconnect module being a pluggable, field-replaceable unit that is separate from the I/O module, the interconnect module providing a serialized communication path between the first and second sets of differential signal pairs for carrying serialized differential signaling corresponding to communications exchanged between the root complex of the CPU module and the I/O module, the interconnect module including logic for converting the serialized differential signaling from a first low-voltage differential signaling protocol format into a second low-voltage differential signaling protocol format.

22. An electronics enclosure, comprising:
an I/O (input/output) module;
a CPU (central processing unit) module having a root complex; and
an interconnect module electrically connected to the root complex of the CPU module by a first set of differential signal pairs and to the I/O module by a second set of differential signal pairs, the interconnect module being a pluggable, field-replaceable unit that is separate from the I/O module, the interconnect module providing a serialized communication path between the first and second sets of differential signal pairs for carrying serialized differential signaling corresponding to communications exchanged between the root complex of the CPU module and the I/O module, the interconnect module including a protocol switch having a non-transparent port by which the CPU module can engage in peer-to-peer communications with another CPU module.

23. An electronics enclosure, comprising:
an I/O (input/output) module;
a CPU (central processing unit) module having a root complex; and
an interconnect module electrically connected to the root complex of the CPU module by a first set of differential signal pairs and to the I/O module by a second set of differential signal pairs, the interconnect module being a pluggable, field-replaceable unit that is separate from the I/O module, the interconnect module providing a serialized communication path between the first and second sets of differential signal pairs for carrying serialized differential signaling corresponding to communications exchanged between the root complex of the CPU module and the I/O module, the interconnect module further comprising a switching fabric in the serialized communication path between the first and second sets of differential signal pairs, the switching fabric being one of a Fibre Channel, Ethernet, and INFINIBAND switching fabric.

24. An interconnect module, comprising:
a circuit board;
a first electrical connector electrically coupled to the circuit board for removably plugging the circuit board to a CPU (central processing unit) module, the first electrical connector having electrical pins providing a first set of differential signal pairs by which to carry serialized differential signaling between the circuit board and the CPU module;
a second electrical connector electrically coupled to the circuit board for removably plugging the circuit board to an I/O (input/output) module, the second electrical connector having electrical pins providing a second set of differential signal pairs by which to carry serialized differential signaling between the circuit board and the I/O module;
a serialized communication path between the first and second sets of differential signal pairs of the electrical connectors for carrying serialized differential signaling corresponding to communications exchanged between the CPU module and the I/O module; and
a switching fabric in the serialized communication path between the first and second sets of differential signal pairs, the switching fabric being one of a Fibre Channel, Ethernet, and INFINIBAND switching fabric,
wherein the interconnect module is a pluggable, field replaceable unit that is separate from the I/O module to which the second electrical connector is removably plugged.

* * * * *